United States Patent [19]

Slater

[11] 4,085,912

[45] * Apr. 25, 1978

[54] CONVERTIBLE AIRSHIP

[76] Inventor: Saul I. Slater, 1427 W. 22 St., Sunset Island 4, Miami Beach, Fla. 33140

[*] Notice: The portion of the term of this patent subsequent to Jul. 27, 1993, has been disclaimed.

[21] Appl. No.: 674,278

[22] Filed: Apr. 14, 1976

Related U.S. Application Data

[63] Continuation-in-part of Ser. No. 552,793, Feb. 25, 1975, Pat. No. 3,971,533.

[51] Int. Cl.² .............................................. B64B 1/38
[52] U.S. Cl. ...................................... 244/25; 244/30; 244/115; 244/127; 244/7 B
[58] Field of Search .................................... 244/25–31, 244/93, 115, 116, 127, 24, 7 R, 7 A, 7 B, 7 C

[56] References Cited

U.S. PATENT DOCUMENTS

| 7,207 | 3/1850 | Bell | 244/30 X |
|---|---|---|---|
| 804,593 | 11/1905 | Friedel | 244/93 X |
| 998,553 | 7/1911 | Schleicher | 244/25 |
| 1,430,393 | 9/1922 | Lynde | 244/30 X |
| 1,567,703 | 12/1925 | Broyles | 244/115 |
| 1,615,002 | 1/1927 | Avery | 244/26 |
| 1,664,565 | 4/1928 | Mammer | 244/30 X |
| 1,706,830 | 3/1929 | Upson | 244/115 |
| 1,726,062 | 8/1929 | Gilman | 244/25 |
| 2,038,671 | 4/1936 | Olan | 244/30 X |
| 2,070,854 | 2/1937 | Boyer | 244/30 X |
| 2,150,428 | 3/1939 | Crum et al. | 244/115 |
| 2,379,355 | 6/1945 | Hodgdon | 244/25 |
| 3,096,047 | 7/1963 | Dunn | 244/26 |
| 3,971,533 | 7/1976 | Slater | 244/30 |

FOREIGN PATENT DOCUMENTS

| 706,419 | 6/1931 | France | 244/30 X |
|---|---|---|---|
| 87,811 | 1/1894 | Germany | 244/30 X |
| 419,651 | 4/1924 | Germany | 244/116 |
| 504,525 | 11/1926 | Germany | 244/30 X |
| 2,057,287 | 5/1972 | Germany | 244/30 X |
| 185,661 | 9/1922 | United Kingdom | 244/25 |

Primary Examiner—Galen L. Barefoot
Attorney, Agent, or Firm—Morgan, Finnegan, Pine, Foley & Lee

[57] ABSTRACT

A gondola, or cabin structure, is attached to a lighter-than-air gas-containing structure by mounting apparatus enabling rotation of the longitudinal axis of the gas-containing structure through about 90° with respect to the orientation of the gondola. Propulsion devices are mounted on the gas-containing structure to provide propulsion force generally parallel to the longitudinal axis of the gas-containing structure for generating forward thrust during flight and downward or upward thrust during, respectively, descent or ascent. Accordingly, the present invention embraces a method for effecting descent or ascent, which includes the steps of orienting the gas-containing structure in a generally vertical configuration and initiating downward or upward thrust. Advantageously, propulsion devices may be provided on rotatably mounted horizontal stabilizers and/or, when used, rotatably mounted wing structures, to provide horizontally oriented thrust when the gas-containing structure is vertical for stabilizing the gas-containing structure in high winds. Also advantageously, anchoring apparatus are provided only on the gondola for permitting the airship to be anchored substantially only by the gondola.

53 Claims, 22 Drawing Figures

CONVERTIBLE AIRSHIP

CROSS REFERENCE TO RELATED APPLICATIONS

This application is a continuation-in-part of my co-pending application, Ser. No. 552,793, filed Feb. 25, 1975, now U.S. Pat. No. 3,971,533.

BACKGROUND AND OBJECTS OF THE INVENTION

The present invention relates to lighter-than-air gas-containing airships and more particularly to airships convertible from a generally horizontally extending configuration, such as in a conventional blimp or dirigible, to a generally vertically extending configuration.

Balloons, blimps and zepplins have captured the fancy of man since he first aspired to fly. These airships combine desirable characteristics from the standpoint of aerodynamics, travel economy and ecology. Lighter-than-air vehicles can remain aloft indefinitely and are capable of touching down in areas which would be inaccessible for most other conventional transport vehicles. They can be powered by a simple propeller engine and refueling can be accomplished either directly from the ground or by means of a simple umbilical cord from another aircraft.

Airships containing lighter-than-air gas provide an inexpensive and environmentally inoffensive means of transporting people or cargo. Unfortunately, rigid frame zepplins are virtually obsolete and, among currently utilized airships, blimps have been relegated to use for advertising and promotional campaigns while balloons find frequent use by fanciful daredevils in attempted uncontrolled — and usually unsuccessful — record free-air flights.

People have been reticent since the late 1930's to pursue flight by lighter-than-air vessels, after the "Hindenburg" was mysteriously and spectacularly consumed by flames. However, with little modification of old designs — most notably through the use of inert helium gas rather than flammable hydrogen — the airship can be a most useful advance in the field of transportation. One disadvantage to current airships, which the present invention overcomes, is their bulky front to rear size which necessitates large ground area in order to accommodate loading, unloading and refueling. In addition, in order to descend or ascend, airships heretofore have usually relied upon heavy and expensive pumping devices for changing the effective density of the lighter-than-air gas, especially when landing and taking off.

It is therefore an object of the present invention to provide a new and improved airship. Another object of the invention is to provide a new and improved airship convertible from a generally horizontal to a generally vertical configuration.

It is also an object of the invention to provide a new and improved airship capable of descent and ascent without necessarily requiring equipment to vary the effective density of the lighter-than-air gas within the gas-containing structure.

It is another object of the invention to provide a new and improved airship capable of carrying relatively heavy loads, including fuel for long distance travel, which is not completely dependent upon equipment for varying the effective density of the lighter-than air gas in order to ascend and descend.

It is a further object of the present invention to provide a new and improved method for effecting descent and ascent of convertible airships.

It is still another object of the invention to provide a new and improved convertible airship having improved stability while maneuvering and while anchored.

It is also an object of the invention to provide a new and improved airship having a simple and strong anchoring means, with the airship requiring substantially little land area for touchdown and anchoring.

It is yet a further object of the invention to provide an airship whose gondola can be located at various positions with respect to the gas-containing structure so that the airship can be oriented at any angle to accommodate various wind conditions.

It is still another object of the invention to provide an airship with the capability of conversion from a generally dirigible-like configuration to a generally balloon-like configuration in both all-fabric and rigid-frame/fabric airships.

Objects and advantages of the invention are set forth in part herein and in part will be appreciated herefrom, or may be learned by practice with the invention, the same being realized and attained by means of the instrumentalities and combinations as well as the steps and operations pointed out in the appended claims. Accordingly, the invention resides in the novel method as well as the novel structures, arrangements and improvements herein shown and described.

SUMMARY OF THE INVENTION

Briefly described, the convertible airship according to the present invention includes a generally elongate gas-containing structure adapted to contain a lighter-than-air gas and a gondola mounted to said gas-containing structure by mounting means enabling the longitudinal axis of the gas-containing structure to be rotated between a generally horizontal orientation to a generally vertical orientation. Advantageously, and as here preferably embodied, the airship includes propulsion means mounted to said gas-containing structure adapted to provide thrust generally parallel to said longitudinal axis, such that said propulsion means can provide forward thrust when the longitudinal axis is horizontal to propel the airship in flight, and such that said propulsion means can provide downward thrust when the longitudinal axis is vertical to cause the airship to descend. Also advantageously, the propulsion means is also provided with reversible thrust capability such that it can provide upward thrust when the axis is vertical to cause the airship to ascend.

Accordingly, the method for landing a convertible airship includes the steps of substantially stopping all forward propulsion, rotating the longitudinal axis to a generally vertical orientation and propelling the airship downwardly toward earth. Likewise, the method for lifting a convertible airship includes the steps of reversing the downward thrust of the propulsion means to an upward thrust and rotating the longitudinal axis to a generally horizontal orientation when a predetermined altitude is reached for initiating forward propulsion. Thus, the airship according to the invention includes a method, and means therefor, for controlled descent and ascent, such that apparatus for changing the effective density of the lighter-than-air gas may not be necessary or need not be completely relied upon.

It will be found that the airship according to the present invention exhibits the recognized advantages of lighter-than-air vehicles, including efficient and low-cost operation. Moreover, due to their convertibility, these airships have the further capability of landing in areas of limited access for loading, unloading and refueling, all of which can be accomplished directly at the point of origin as well as the point of ultimate destination, thus eliminating the need for intermediate storage and distribution facilities.

In addition, if propulsion means are provided on rotatable stabilizers and/or wings, the vertically extending gas-containing structure can be relatively stabilized in high winds while the airship is anchored. To this end, the present invention includes anchoring means only on the gondola.

It will be understood that the foregoing general description as well as the following detailed description are exemplary and explanatory of the invention, but are not restrictive thereof. Accordingly, the accompanying drawings, referred to herein and constituting a part hereof, illustrate preferred embodiments of the invention and, together with the description, serve to explain the principles of the invention.

DETAILED DESCRIPTION OF THE PREFERRED EMBODIMENT

Figure 1:
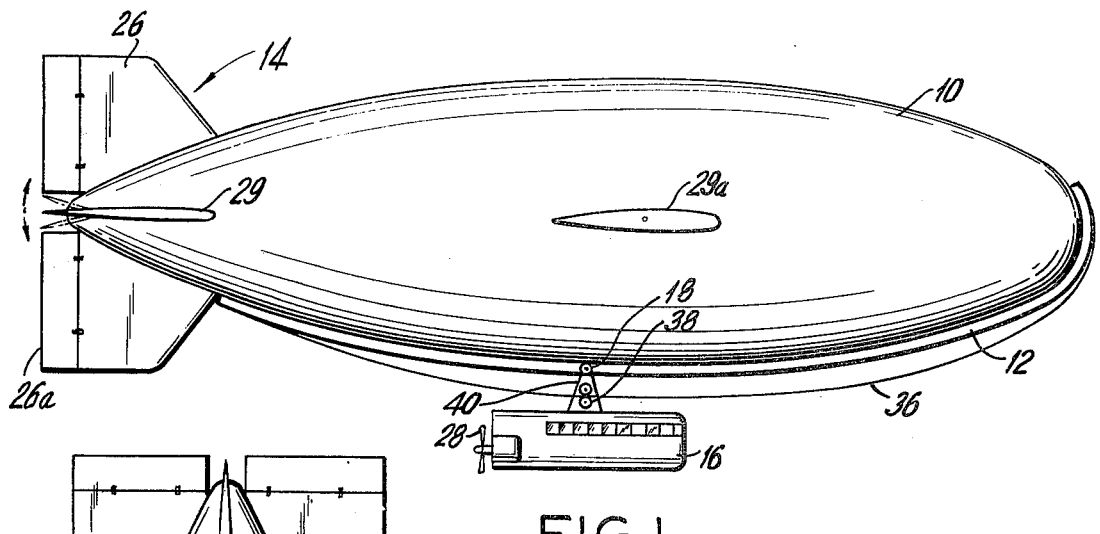
FIG. 1 is a side view of an airship according to the present invention with its longitudinal axis horizontal.
Figure 2:
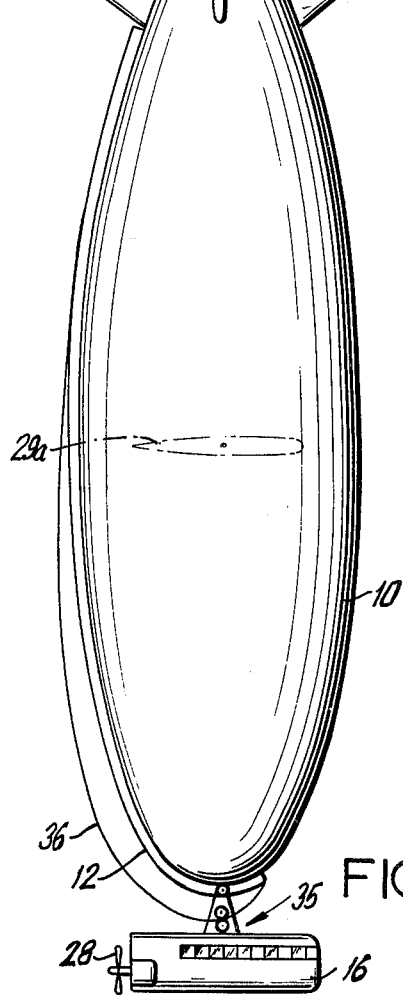
FIG. 2 is a side view of an airship according to the present invention with its longitudinal axis vertical.
Figure 7:
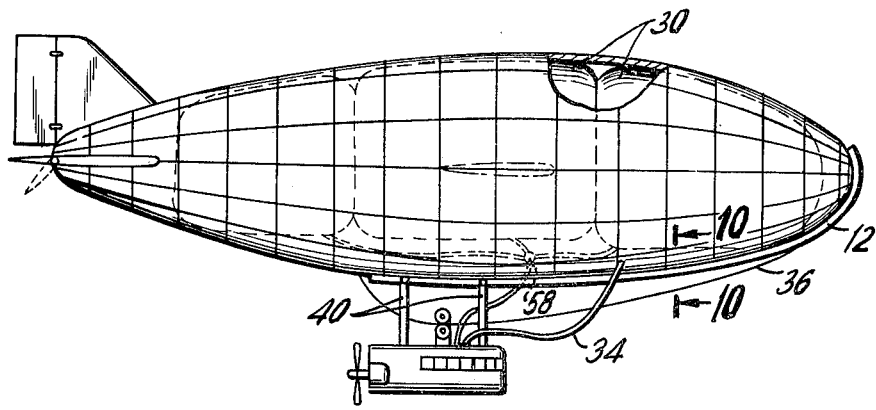
FIG. 7 is a side view of an airship having multiple support members affixed to one or more structural/track members.

Referring now to FIGS. 1 and 2, the airship according to the invention comprises gas-containing envelope 10 adapted to contain a lighter-than-air gas. Envelope 10 may be a substantially all-fabric structure whose shape is maintained through internal gas pressures (such as in a blimp) as shown in FIG. 7 or it may be a rigid-frame/fabric structure (dirigible) such as that shown in FIG. 4. The airship envelope 10 has rigid structural/track support member 12 mounted substantially along the underside of the envelope. Advantageously, structural/track member 12 extends from a point aft of the midsection to a point above the nose of the gas envelope. Gondola 16 is pivotally and slidably mounted to structural/track member 12 by mounting means 18 which may form the upper end of gondola support member 40. Mounting means 18 is fitted onto structural/track member 12 such that gondola may "slide" laterally along member 12 and rotate about said mounting means at any point on member 12.

Figure 9D:
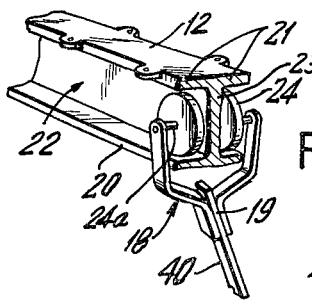
FIGS. 9a-9d are perspective views of structural/track members, mounting means and positioning means according to different aspects of the present invention.
Figure 9A:
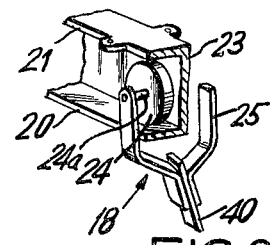

Referring now to FIG. 9a, structural/track member 12 may be a channel beam having web section 23, extended low flange 20 and upper flange 21. Mounting means 18 comprises roller means 24, on axle means 24a, which rides on the upper surface of flange 20. Bracing means 25 which may be a vertically oriented post is formed on yoke or cradle 19 portion of support member 40. Bracing means 25 is preferably maintained in close proximity to web 23 in order to steady gondola 16 as it slides and/or pivots and to prevent mounting means 18 from becoming disengaged from structural/track member 12. Alternatively, bracing means 25 may include second roller means 27 having its axis of rotation substantially parallel to web 23 as shown in FIG. 9b in order to allow substantially frictionless movement of the gondola as it slides and/or pivots with respect to member 12.

Figure 9B:
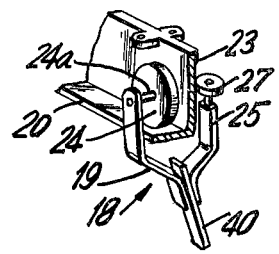

According to another aspect of the present invention, structural/track member 12 can be an angle beam having web 23 and flange 20 as shown in FIG. 9b. Mounting member 18 may be substantially similar to that described for use with the channel beam. It is particularly useful for this embodiment that cradle 19 of mounting member 18 be formed so as to ride close to the bottom of lower flange 20 in order to prevent roller 24 of mounting member 18 from rising to either puncture the gas envelope or "derail" from the track.

Figure 9C:
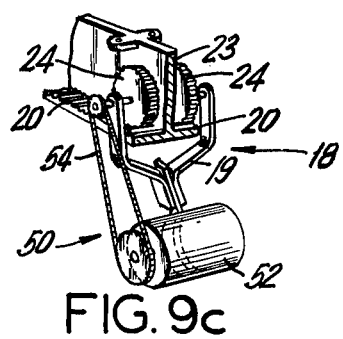
Figure 10:
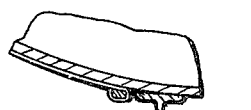
FIG. 10 is an enlarged view of section 10—10 of FIG. 7.

Alternatively, structural/track member 12 can be a T-beam including web 23 and two flanges 20 as shown in FIG. 9c. Mounting means 18 can comprise a double roller cradle 19 having two roller means 24 which ride, one each, on the two flanges 20. As discussed above with reference to FIG. 9b, the cradle 19 may be formed close to the bottom of beam flanges 20 in order to prevent puncture of the gas envelope, or derailment.

In the preferred embodiment, as depicted in FIG. 9d, structural/track member 12 comprises an I-beam comprising web section 23, two upper flanges 21 and two lower flanges 20. Two channels 22, separated by web 23, are defined in the I-beam to accommodate two roller means 24 for mounting the gondola onto track member 12. Thus, the gondola is capable of both pivotal and slidable movement with respect to the gas envelope as shown in FIGS. 1 and 2. Cradle 19 of mounting means 18 may be formed in any convenient configuration since upper flanges 21 contain the mounting member 18 to prevent puncture of envelope 10 or derailing.

Figure 3A:
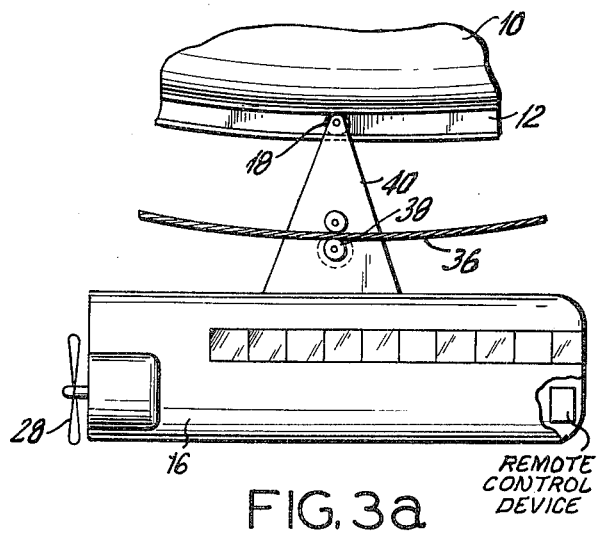
FIGS. 3a-3b are side views showing mounting and positioning means according to one aspect of the present invention.
Figure 3B:
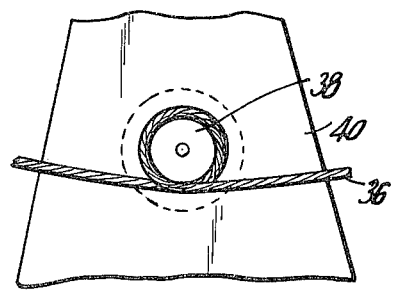

In order to control the flight of an airship according to the present invention, the airship is provided with tail wing assembly 14 comprising at least one vertical stabilizer 26 and two horizontal stabilizers 29 which can be formed with rudders and ailerons respectively. Advantageously, the operable portions of the tail wing assembly may be remotely controlled by remote control means illustrated in cut-away in FIG. 3a) from the gondola.

In a particularly useful embodiment of the present invention, the horizontal stabilizers may be completely pivotally attached to the gas envelope, as shown in FIG. 2, for enhancing the stability of the airship. Accordingly, while the gondola traverses from its "normal" position below the belly of gas-containing envelope 10 (to rotate the longitudinal axis of the gas envelope), the horizontal stabilizers can be simultaneously rotated through 90° such that their axes remain substantially parallel to the ground or to the wind velocity thereby lending additional stability to the vertically extending gas envelope, especially during its rotating maneuvers. Advantageously, wings 29a may be added to the airship, and pivotally mounted to envelope 10, as shown by FIGS. 1–2. Wings 29a may be rotated substantially synchronously with the horizontal stabilizers to further enhance the airship's stability. Furthermore, when envelope 10 is oriented in or is being reoriented to a vertical configuration, propulsion means 28 may be continuously operated so as to assist maintaining the airship in a substantially stationary posture. This is particularly useful to prevent appreciable drift of the airship when preparing to load or unload, or while performing its maneuvers.

Figure 4:
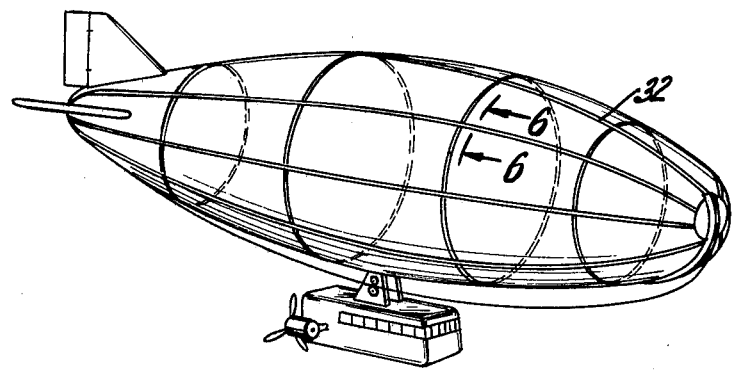
FIG. 4 is a perspective view of the outer skin support structure for an airship employing the present invention.
Figure 5:
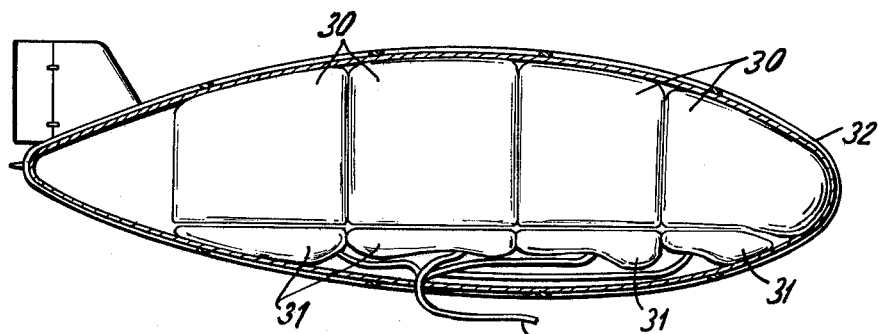
FIG. 5 is a cut-away view showing internal gas bags.

Whether the airship is a rigid frame-fabric gas envelope as shown in FIG. 4 or an all-fabric gas envelope as shown in FIG. 7, gas-containing envelope 10 may house gas bags 30 fitted therein. Gas bags 30 are adapted to contain the lighter-than-air gas, such as helium, to provide the buoyancy for lifting the airship. The airship's ascent and descent is governed by manipulating the effective density of the gas contained by bags 30 and suitable means are included in the airship to accomplish this. Accordingly, envelope 10 may be formed with airtight outer skin 32 and connected to a source of air or other suitable "heavy" gas (hereinafter referred to as air) by umbilical cord 34. Airship descent is effected by forcing the air through conduit 34 into outer skin 32. The pressure generated by the introduced air compresses gas bags 30 to increase the effective density of the lighter-then-air gas in the bags. Additional ballast is also provided by the weight of the air. The buoyancy of the airship is thereby reduced, causing a loss in altitude. Alternatively, airtight bags 31 may be provided within envelope 10 for receiving the air through branches of conduit 34 as shown in FIG. 5. This is particularly useful in maintaining control of the airship despite any damage which may have been suffered by the outer skin. Likewise, when ascent is desired, the air is evacuated from envelope 10, or air bags 31, to relieve the pressure on gas bags 30 and to release the air ballast. The gas within gas bags 30 expands, thereby reducing the effective density of that gas to increase buoyancy of the airship.

In normal operation, gondola 16 is positioned substantially mid-way under the belly of the gas envelope to maintain the airship in substantially horizontal equilibrium during flight. The airship is driven by propulsion means 28 which can be either a simple propeller engine or turbopropeller engine. However, it will be understood that gondola 16 may be positioned anywhere along member 12 for balance such as when additional propulsion devices 60 are mounted to envelope 10, as hereinafter described.

When the airship according to the present invention has reached its destination, gondola 16 may be moved laterally along structural/track member 12 toward the airship's nose by positioning means 35. As the gondola travels along track member 12, the longitudinal axis of gas-containing envelope 10 rotates towards a substantially vertical orientation. According to one aspect of the present invention, positioning means 35 is connected to gondola 16 to govern its position along structural/track member 12. Positioning means 35 may comprise cable 36 and winch means 38. Cable 36 may be conveniently affixed to envelope 10 such as by attachment to the two ends of track member 12. Furthermore, cable 36 may be substantially taut to prevent drift of gondola 16 vis-a-vis track member 12.

Winch means 38 acts on cable 36 to pull gondola 16 along member 12 via mounting means 18 which may comprise a combination of roller means 24 and axle means 24a. As gondola 16 nears the nose of gas-containing envelope 10, mounting means 18 allows pivoting of gondola 16 about its point of contact on member 12 such that gondola 16 remains substantially horizontal. In operation, as gondola 16 moves along structural/track member 12 via mounting means 18, the action of the shifting positions of the gondola's weight, which may be represented as a point load acting on member 12, causes the gas-containing envelope 10 to rotate its longitudinal axis continuously until the gondola reaches the section of member 12 adjacent the nose at which time the longitudinal axis is substantially vertical.

According to another aspect of the present invention, positioning means 35 may comprise non-slip interface between roller means 24 and flanges 20 having a non-slip interface therebetween which may be in the form of cooperating teeth formed on both roller means 24 and the upper surfaces of each flange 20 as shown in FIG. 9c. Alternatively, positioning means 35 may comprise a high friction roller-flange interface such as by rubberized roller means 24 abutting a rougnened upper surface of each flange 20. According to either embodiment, roller means 24 may be rotated by any convenient drive means 50. Drive means 50 may comprise either a conventional chain-drive motor means 52–54 which rotates roller means 24 as shown in FIG. 9c, or it may be a direct drive motor connected directly to roller means 24.

Figure 8:
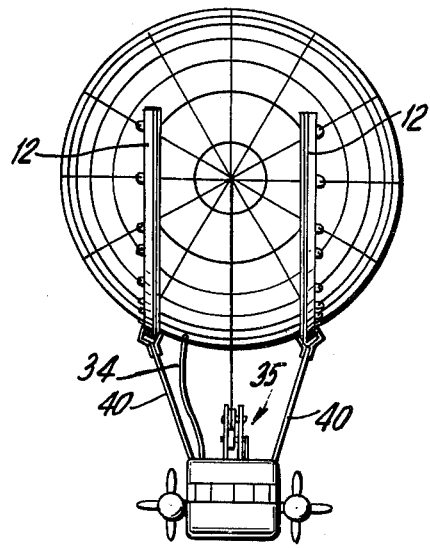
FIG. 8 is a front view of an airship according to the present invention having two structural/track members.

FIGS. 7 and 8 depict another aspect of the present invention in which gas-containing envelope 10 may be provided with two structural/track members 12 and gondola 16 is formed with multiple support members 40, each provided with a mounting assembly 18, as described above with reference to FIGS. 9a–9d, for mounting the gondola to the structural/track members. This is particularly useful for large capacity airships which can accommodate heavy cargo. Advantageously, the gondola may be provided with four support members 40 on the two structural/track members to prevent any substantial forward-to-aft or side-to-side pitching of the gondola due to gusting winds etc. during flight.

In operation, the gondola rides below the belly of the gas envelope as in a common dirigible or blimp such that the longitudinal axis of the gas-containing envelope 10 is generally parallel to the ground. Should the airship encounter high winds, the gondola may be moved forward or backward of the normal equilibrium point to give the airship an angle of attack, negative or positive with respect to air flow to enhance stability during flight.

The airship according to the present invention is particularly adapted for convenient refueling, loading and unloading at points of origin and ultimate destination, especially where such points are inaccessible by other conventional transport means. The gondola is brought forward to the nose of the airship, thereby rotating the longitudinal axis of the gas envelope to a substantially vertical orientation as shown in FIG. 2. With the gondola so positioned, the helium gas bags can be compressed by the introduction of air through umbilical cord 34, causing the airship to descend.

Alternatively, descent of the airship can also be effected by allowing the lighter-than-air gas to escape from gas bags 30. Accordingly, bleeding means which may be in the form of a remote controlled release valve (not shown) or second umbilical cord assembly 58 (shown in FIG. 7 connected to gondola 16) for controlling the quantity of gas in gas bags 30. This procedure for descent is particularly useful when gas envelope 10 and/or air bags 31 are damaged whereby altitude control would otherwise be lost, or when an emergency arises and rapid descent must be effected. Furthermore, this bleeding means can be utilized in reverse for filling gas bags 30.

As the airship is descending for a landing in accordance with one of the above-described procedures, or in accordance with one of the hereinafter described features, gondola 16 may be landed directly on the ground or adjacent a loading platform by utilizing propulsion means 28 in conjunction with the ailerons and elevators provided on stabilizer assembly 14 to guide the airship to its proper landing position. This permits a simple method of landing the airship at a site of limited area, whereby a tie-line may be lowered to a landing crew which can have the airship pulled down to its proper landing position. Once in landing position, the airship can be anchored or suitably tied down, especially as hereinafter described, for loading, unloading or refueling. Thus, passengers and/or cargo may be loaded or unloaded directly onto the gondola without necessitating additional equipment such as lowering and hoisting winches or shuttle craft. Furthermore, the present invention obviates the need for intermediate storage facilities and minimizes the necessity for subsequent transporting when used for shipping cargo.

As a further feature of the present invention, when the airship is landing or has landed and a strong wind prevails at the landing site, the airship can be stabilized by utilizing fully rotatable horizontal stabilizers 29, and rotatable wings 29a if present, in conjunction with propulsion means 28 or cut into the wind and stabilize the vertically extending envelope with respect to the air flow. In addition, the horizontal stabilizers and wings may be oriented with a negative angle of attack to urge the airship toward the ground and enhance its stability vis-a-vis the ground.

Figure 11:
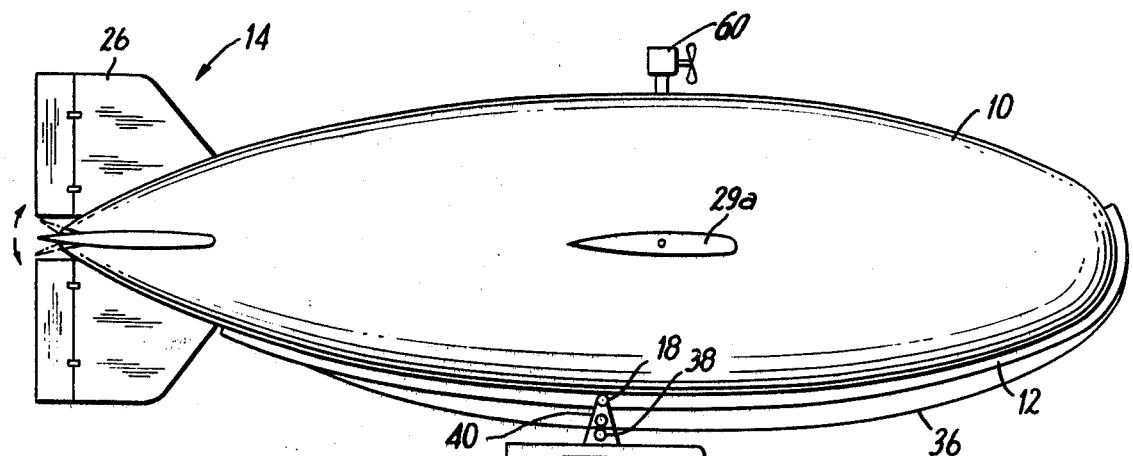
FIG. 11 is a side view of another embodiment of the present invention.
Figure 12:
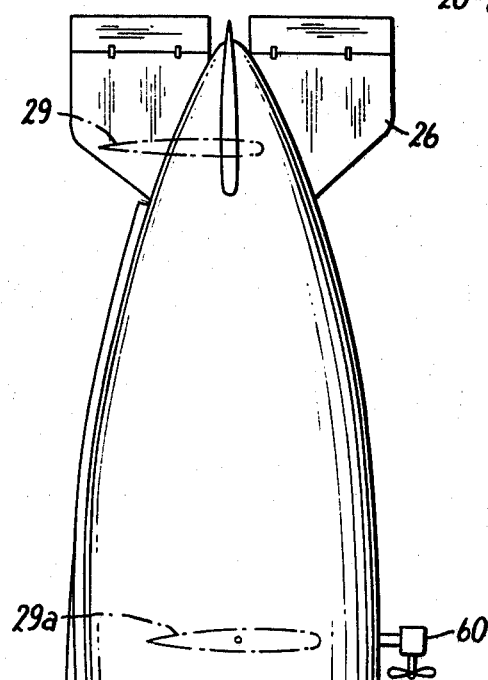
FIG. 12 is a side view of the embodiment shown in FIG. 11 in a generally vertical configuration.

Referring now to FIGS. 11 and 12, there is shown a preferred embodiment of the present invention which can obviate the need for apparatus for varying the effective density of the lighter-than-air gas contained in gas-containing envelope 10. According to this aspect of the invention, envelope 10 is provided with at least one additional propulsion means (indicated by reference numeral 60) mounted thereto such that it provides propulsion at a substantially constant orientation with respect to the longitudinal axis of envelope 10. Additional propulsion means 60 may therefore be utilized to drive this vehicle during flight. More importantly, and of most significance here, additional propulsion means 60 may be used to facilitate descent and touchdown of the vehicle, especially after a flight when the vehicle has greater buoyancy due to the loss in weight of expended fuel.

Figure 6:
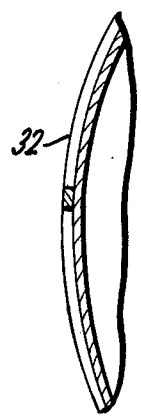
FIG. 6 is an enlarged view along section 6—6 of FIG. 4.

Accordingly, once the desired landing site has been reached, the forward drive imparted by both propulsion means 60 and 28 is substantially ceased. Thereafter, the airship is brought into its landing configuration, as described more fully hereinbefore, wherein the longitudinal axis of envelope 10 is in a substantially vertical orientation. Using propulsion means 28 when necessary for maneuvering during descent and ascent, as previously described, the airship may be driven towards the ground by propulsion means 60 in conjunction with tail wing assembly 14 for guidance, as well as wings 29a when employed. Thus, the need for a plurality of air bags 31, along with the pumping equipment and conduits described above with reference to FIGS. 5–7, or any other apparatus for reducing the effective density of the lighter-than-air gas contained within envelope 10, may be obviated, since propulsion means 60 furnishes the necessary impetus for bringing the airship home. Furthermore, propulsion means 60 may be continuously operated to keep the airship down when, for example, it is not desirable or it is impossible to anchor the airship.

Likewise, propulsion means 60 may be utilized for takeoff and ascent of the airship, especially after it has been loaded with cargo and passengers and re-fueled, when the airship is at its heaviest. To this end, additional propulsion means 60 are provided with means for reversing its thrust to change the direction of the propulsion thrust. Thus, for example, when propulsion means 60 comprises a propeller engine, it may be provided with reversible pitch propeller means for completely reversing the thrust generated thereby. Accordingly, once the airship is ready for take-off, the thrust of additional propulsion means 60 is reversed, vis-a-vis that provided during landing, and the airship, with guidance from tail assembly 14 and wings 29a, will be propelled upwardly. Once airborne, envelope 10 can be re-oriented to a generally horizontal configuration and thereafter conduct normal in-flight operation.

For complete safety, however, it may not be adequate to rely upon a single additional propulsion device for ascent and descent capability. Therefore, it may still be necessary to provide some emergency device for controlling the effective density of the lighter-than-air gas contained in envelope 10. In addition, means for releasing lighter-than-air gas from envelope 10, such as bleeding means 58 described hereinbefore, may be included to provide descent capability in an emergency. Furthermore, more than one additional propulsion devices 60 may be mounted to envelope 10 for additional safety means and/or, as hereinafter described, for additional thrust.

Figure 13:
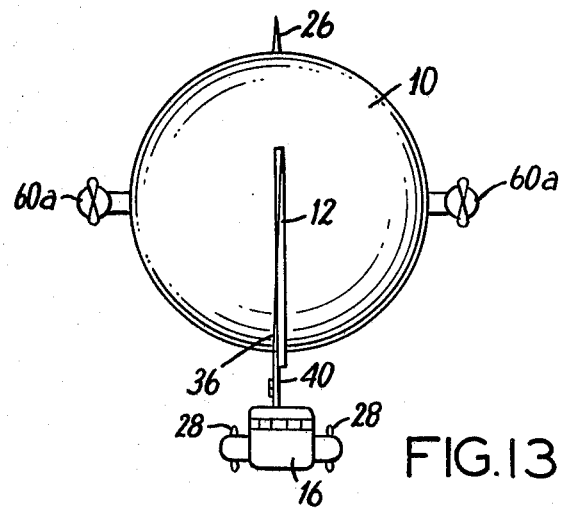
FIG. 13 is a front view of still another embodiment of the present invention.
Figure 14:
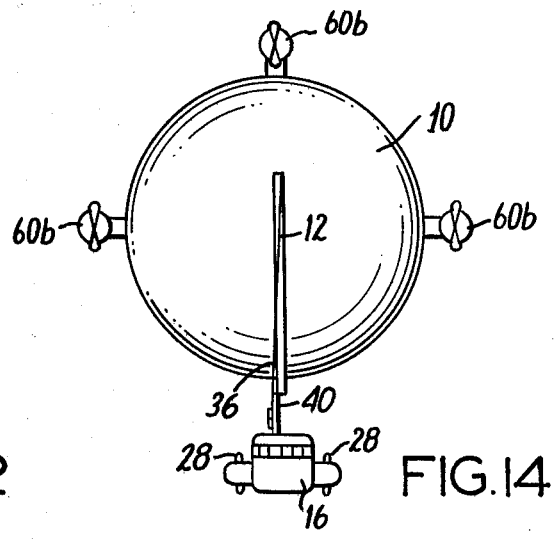
FIG. 14 is a front view of yet another embodiment of the present invention.

Referring therefore to FIGS. 13 and 14, there are shown, preferred embodiments of the present invention which include, respectively, two and three additional propulsion devices, 60a and 60b, respectively. Furthermore, individual control over each separate propulsion device will provide optimum stability of and control over the flight path of the airship during descent and ascent or forward flight in turbulence. Additional propulsion means 60 offer a further advantage when the airship has wings 29a (even if such wings are not rotatably mounted to the airship), since, after loading and refueling, the airship may not literally be "lighter-than-air". Accordingly, additional propulsion means 60 may be employed to lift the airship off the ground. Once the airship is airborne, it may be maintained aloft, in flight, through the lift provided by wings 29a as the vehicle is driven forward by the propulsion devices. Thus, the airship is capable of completely vertical take-off (for example, from areas of limited access, as discussed hereinbefore) yet of maneuvering substantially like a lighter-than-air vehicle when fully loaded and re-fueled.

Figure 18:
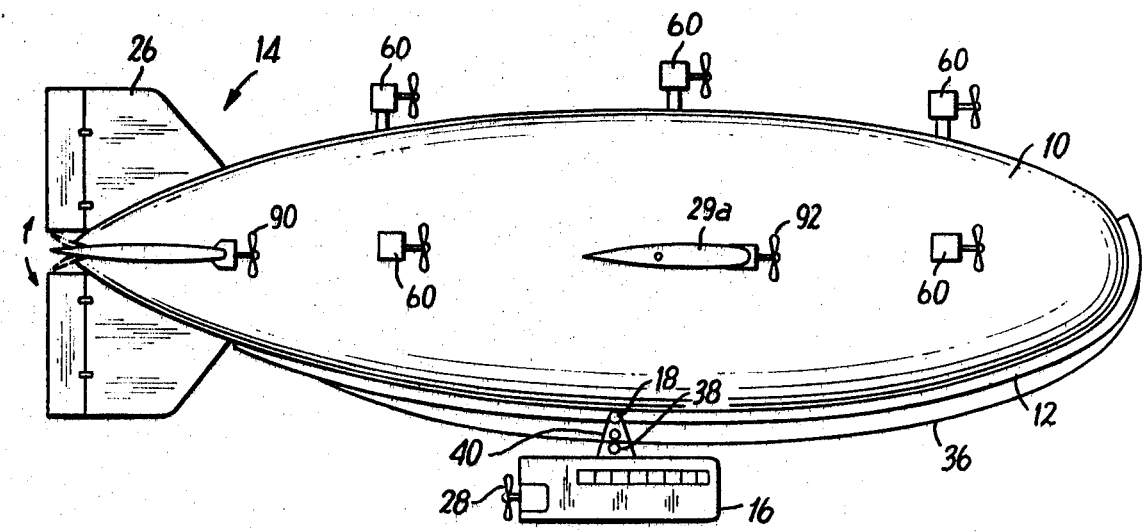
FIG. 18 is a side view of an embodiment of the invention having groups of propulsion devices mounted to the gas-containing structure.
Figure 16:
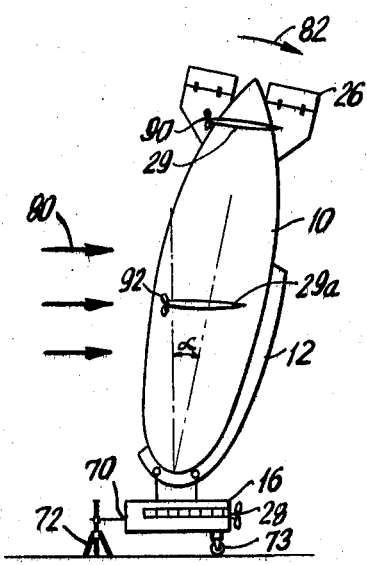
FIG. 16 is a side view of anchoring means according to the invention.

Referring now to FIGS. 16 and 18, there are shown embodiments of the present invention, which include additional propulsion devices mounted to rotatable horizontal stabilizers 29 and, when used, rotatable wings 29a, with additional propulsion devices 90 mounted to horizontal stabilizers 29 and propulsion devices 92 mounted to wings 29a when used. In addition to providing in flight forward thrust and vertical thrust capability for use in ascent and descent, when desired, propulsion devices 90 and 92 enable additional stability capability when the vertically extending airship is anchored and high winds are encountered. To this end, stabilizers 29 may be rotated to a generally horizontal orientation, or generally parallel to the wind flow, as described hereinbefore, with propulsion devices 90 running to provide thrust generally opposed to the wind direction. Thus, gas envelope 10 can be maintained in a generally vertical orientation to prevent damage to the airship by, for example, excessive deflection of envelope 10 (as measured by angle α, more than about 30° or 40°) which may strain the coupling means between gondola 16 and envelope 10 or propel envelope 10 into some nearby object which may pierce it.

Similarly, when the airship is being landed in windy conditions, stabilizers 29 and propulsion devices 90 may be directed so as to oppose the wind direction to assist controlling the descent (or ascent during take-off) of the airship during landing maneuvers and guiding it to touchdown. To this end, and when the airship includes rotatable wings 29a, additional propulsion devices 92 may advantageously be provided thereon to allow further control of the airship during ascent and descent as well as of envelope 10 when the airship is anchored, substantially as described above with reference to propulsion devices 90. However, where the wind conditions at the landing site are not of concern, propulsion devices 90, and 92 when provided, may be used to provide vertical thrust for supplementing additional propulsion devices 60 (or in place of devices 60 if none have been provided) to provide the vertical thrust for ascent and descent, as described hereinbefore.

Figure 15:
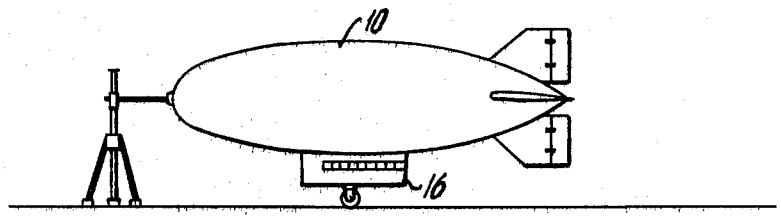
FIG. 15 is a side view of anchoring means for conventional airships.

According to another aspect of the present invention, the airship may be more conveniently and safely anchored than currently used airships. Conventional lighter-than-air airships are anchored in a generally horizontal orientation with the nose (bow) of the gas envelope rotatably attached to a tall pole, as shown generally in FIG. 15. In addition, a castor may be attached to the bottom of the gondola (which is rigidly attached to the gas envelope) such that the entire airship may be freely rotatable about the pole and move under the influence of prevailing winds. Thus, a substantially large land area is required to allow such airships to rotate 360° around the swivel or pivot point to accommodate all wind conditions.

However, in a particularly useful embodiment of the present invention, means are provided for securely and safely anchoring the airship at a landing site of limited area. Accordingly, attachment means 70 may be provided on gondola 16, substantially at the front thereof for pivotal attachment to stanchion 72 which is firmly secured to the ground, as shown in FIG. 16. Thus, when the airship is brought into a vertical orientation for landing, as described hereinbefore, the airship may be anchored to stanchion 72 on the ground by attachment means 70. Thereafter, positioning means 35 may be left slack to enable vertically extending gas envelope 10 to move or rotate (as indicated by arrow 82) through any angle α under the influence of prevailing winds (indicated by the arrows 80).

Accordingly, an airship including this feature of the present invention can be anchored to the ground so as to be substantially freely rotatable about stanchion 72, yet allowing vertical angular movement of envelope 10 with respect to gondola 16. The airship is therefore provided with sufficient "give" to yield to prevailing winds for preventing damage thereto while anchored. As here preferably embodied, roller means 73 (advantageously a castor) may be provided near or at the back end of gondola 16 to provide a second support point on gondola 16 such that the back end of the gondola can swing around stanchion 72 together with envelope 10 as a unit. Thus, stanchion 72 is shorter than currently used anchoring poles for strength and low cost.

Figure 17:
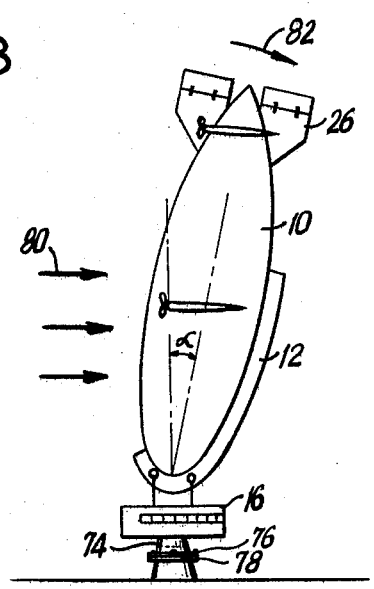
FIG. 17 is a side view of another embodiment of anchoring means according to the invention.

Another preferred embodiment of anchoring means is shown in FIG. 17. According to this embodiment, the airship includes anchoring structure 74 secured to the bottom of gondola 16, generally at its mid-section or, preferably, at its center of gravity. Anchoring structure 74 is advantageously provided with mounting plate 76 adapted for secure engagement to a suitable anchor plate 78 secured to the ground. Anchoring structure 74, secured through mounting plate 76 and anchor plate 78 is rotatable with respect to gondola 16 and the ground. Accordingly, when mounting plate 76 and anchor plate 78 are coupled, the entire airship is capable of rotating or swiveling about the point to which anchor plate 78 is secured to the ground. In addition, with positioning means 35 maintained slack, the airship is provided with sufficient vertical angular yield capability to avoid being damaged by strong winds while the airship is anchored.

Advantageously, mounting plate 76 includes an electromagnet operable from the gondola, which is capable of generating a strong attractive force to ferromagnetic anchor plate 78. Accordingly, when the airship has descended, as described hereinbefore, the electromagnet may be energized to attract the airship to anchor plate 78. Thereafter, plates 76 and 78 may be clamped together by any conventional clamping means to provide a safety coupling between plates 76 and 78. For ascent, the clamps are removed and the electromagnet de-activated, and the airship may ascent as described hereinbefore. As here preferably embodied, mounting plate 76 is rotatable with respect to gondola in order that the airship may be safely anchored (as discussed immediately above) to a simple steel plate secured to the ground, either as a standard procedure or during an emergency.

Advantageously, and as here preferably embodied, by utilizing propulsion devices 90 and/or 92, the axis of envelope 10 is maintained at a small angle with respect to vertical (i.e. α ranges from about 5° to 15°) in order that the airship will more easily swivel around stanchion 72, or anchoring structure 78, under the influence of varying wind directions. Thus, with the preinclined angular orientation of envelope 10, it acts somewhat like a weather vane to accommodate changes in wind direction, thereby significantly lessening any possibility of straining the airship under such conditions.

Those skilled in the art will recognize that certain changes or modifications may be made in the structures described above, without departing from the scope and spirit of the invention as defined in the appended claims. For example, more than three additional propulsion devices 60 may be provided on gas-containing envelope 10. Thus, as shown in FIG. 18, several groups, or longitudinally disposed tier-like arrangement, of such additional propulsion devices (each indicated by reference numeral 60) may be mounted to envelope 10 at, for example, about one-quarter, one-half and three-quarters the way longitudinally along the exterior of the envelope to provide substantial forward thrust when the axis of envelope 10 is horizontally oriented and substantial downward and upward thrust when the axis is vertically oriented. In addition, when either propulsion device 90 or 92, or both, are provided and their corresponding mounting structures (stabilizers 29 and wings 29a) are rotatably mounted to gas-containing member 10, these structures can be oriented at various angles with respect to the longitudinal axis to vary the direction of thrust generated by these devices for enabling controlled maneuverability of the airship, especially when descending and ascending to facilitate accurate landing and safe take-off under windy conditions.

Accordingly, the invention in its broader aspects is not limited to the specific embodiments herein shown and described, but variations may be made therefrom within the scope of the accompanying claims, without departing from the principles of the invention and without sacrificing its principal advantages.

What is claimed is:

1. An airship convertible between a generally horizontal configuration and a generally vertical configuration, comprising:

a generally elongate outer envelope structure adapted to house a lighter-than-air gas and any enclosure means used for containing the gas;

a gondola adapted to be mounted to said envelope structure;

means for generally slidably mounting said gondola to said envelope structure to enable rotation of the longitudinal axis of said envelope structure between generally horizontal and generally vertical orientations while said gondola maintains a generally horizontal orientation by variably positioning said gondola generally along said envelope structure from a point generally under said envelope structure when its longitudinal axis is generally horizontal to a point generally at the nose of the envelope structure when its longitudinal axis is generally vertical;

means for variably positioning said gondola relative to said envelope structure;

stabilizer means mounted to said envelope structure, said stabilizer means being operable from said gondola to assist controlling said airship during flight and maneuvering; and first propulsion means mounted to said envelope structure adapted to provide thrust generally parallel to said longitudinal axis, such that when said longitudinal axis is generally horizontal, said first propulsion means can provide generally horizontally-oriented thrust for driving said airship in flight, and when said longitudinal axis is generally vertical, said first propulsion means can provide generally vertically-oriented thrust for urging said airship to descend.

2. An airship according to claim 1 wherein said first propulsion means includes at least two propulsion devices mounted on generally diametrically opposed sides of said envelope structure to provide vertical thrust for descent such that the attitude of the airship can be controlled by said propulsion devices for a substantially stable descent.

3. An airship according to claim 2 wherein said propulsion devices are capable of reversible thrust such that when said airship is in said generally vertical configuration, said devices can provide generally vertically oriented thrust for driving said airship aloft.

4. An airship according to claim 3 wherein said propulsion devices are driven propeller devices which include propellers with reversible pitch blades.

5. An airship according to claim 2 which includes more than two of said propulsion devices mounted to said envelope structure in a generally symmetrical manner to provide said controllable descent.

6. An airship according to claim 5 wherein said propulsion devices are capable of reversible thrust such that when said airship is in said generally vertical configuration said devices can provide generally vertically oriented thrust for driving said airship aloft.

7. An airship according to claim 6 wherein said propulsion devices are driven propeller devices which include propellers with reversible pitch blades.

8. An airship according to claim 1 which further includes:

second propulsion means mounted to said gondola for providing propelling capability for said airship from said gondola, such that said second propulsion means can be operated during flight to supplement the generally horizontally oriented thrust provided by said first propulsion means and such that said second propulsion means can be operated during descent and ascent maneuvering to enhance the stability and control of the airship during maneuvering.

9. An airship according to claim 8 wherein said first propulsion means includes at least two propulsion devices mounted on generally diametrically opposed sides of said envelope structure to provide vertical thrust for descent such that the attitude of the airship can be controlled by said propulsion devices for a substantially stable descent.

10. An airship according to claim 9 wherein said propulsion devices are capable of reversible thrust such that when said airship is in said generally vertical configuration, said devices can provide generally vertically oriented thrust for driving said airship aloft.

11. An airship according to claim 10 wherein said propulsion devices are driven propeller devices which include propellers with reversible pitch blades.

12. An airship according to claim 9 which includes three of said propulsion devices mounted to said envelope structure in a generally symmetrical manner to provide said controllable descent.

13. An airship according to claim 12 wherein said propulsion devices are capable of reversible thrust such that when said airship is in said generally vertical configuration, said devices can provide generally vertically oriented thrust for driving said airship aloft.

14. An airship according to claim 13 wherein said propulsion devices are driven propeller devices which include propellers with reversible pitch blades.

15. An airship according to claim 1 wherein said means mounting said gondola to said envelope structure includes:
structural/track means generally rigidly attached to said envelope structure, extending from a point generally near its nose section to a point generally near its midsection, said structural/track member being adapted to accommodate generally slidable mounting of said gondola;
track-mounting means attached to said gondola for generally slidably mounting said gondola to said structural/track means; and, wherein said positioning means enable said gondola to be positioned at substantially any desired point along said structural/track means.

16. An airship according to claim 1 which further includes anchoring means provided only on said gondola such that said airship can be anchored to the ground by anchoring substantially only said gondola to the ground by said anchoring means, substantially without requiring support means to be provided on said envelope structure for contacting the ground.

17. An airship according to claim 16 wherein said anchoring means comprises:
attachment means coupled to said gondola generally at its front end, said attachment means adapted for rotatable attachment to a stanchion affixed to the ground; and
roller means mounted to said gondola generally near its back end for permitting said back end of said gondola to roll along the ground, such that when said airship is anchored by said stanchion, said gondola is substantially freely rotatable about said stanchion to accommodate prevailing winds at the anchoring site substantially without damaging the airship.

18. An airship according to claim 16 wherein said anchoring means comprises a mounting structure provided on the bottom of said gondola generally at the center of gravity of said gondola, said mounting structure adapted for coupling to a suitable anchoring structure affixed to the ground to enable said gondola to rotate relative to the ground such that said gondola is capable of substantially freely rotatable anchoring to the ground to accommodate prevailing wind conditions at the anchoring site.

19. An airship according to claim 18 wherein said mounting structure includes electromagnet means operable from said gondola and wherein said anchoring structure is magnetically attractive such that said mounting structure is capable of electromagnetic coupling to said anchoring structure.

20. An airship according to claim 1 wherein said first propulsion means are mounted to said stabilizer means.

21. An airship according to claim 20 wherein said stabilizer means includes a pair of horizontal stabilizers, each of said horizontal stabilizers having said first propulsion means mounted thereon.

22. An airship according to claim 21 wherein said horizontal stabilizers are rotatably mounted to said gas-containing structure such that when said stabilizers are generally parallel to said longitudinal axis said first propulsion means can provide thrust generally parallel to said longitudinal axis for forward propulsion during flight and vertical propulsion during descent and ascent and when said stabilizers are oriented at an angle with respect to said longitudinal axis said first propulsion means can be used to assist stabilizing the envelope structure under windy conditions.

23. An airship according to claim 1 which further includes a pair of wings mounted to said envelope structure, each of said wings having said first propulsion means mounted thereon.

24. An airship according to claim 23 wherein said wings are rotatably mounted to said envelope structure and which further includes means for controlling said wings from said gondola for orienting said wings during flight and maneuvering such that when said wings are generally parallel to said longitudinal axis said first propulsion means can provide thrust generally parallel thereto for forward propulsion during flight and vertical propulsion during descent and ascent and when said wings are oriented at an angle with respect to said longitudinal axis said first propulsion means can be used to assist stabilizing the airship under windy conditions.

25. An airship according to claim 24 wherein said stabilizer means comprise:
a pair of horizontal stabilizers mounted to said envelope structure, said horizontal stabilizers having first propulsion means mounted thereto; and
means for operating said stabilizers from said gondola to control said stabilizers during flight and maneuvering, such that when said stabilizers are generally parallel to said longitudinal axis said first propulsion means mounted thereto can provide thrust generally parallel to said longitudinal axis for forward propulsion during flight and vertical propulsion during descent and ascent and when said stabilizers are oriented at an angle with respect to said longitudinal axis said first propulsion means mounted thereto can be used to assist stabilizing the airship under windy conditions.

26. An airship according to claim 24 wherein said first propulsion means are also mounted on said stabilizer means.

27. An airship according to claim 26 wherein said stabilizer means are rotatably mounted to said envelope structure.

28. An airship convertible between generally horizontal and generally vertical configurations, comprising:
a generally elongate outer envelope structure adapted to house a lighter-than-air gas and any enclosure means used for containing the gas;
a gondola;
mounting means attached to said envelope structure for mounting said gondola to said envelope structure, said gondola adapted to be mounted to said envelope structure by said mounting means, said mounting means enabling variable positioning of said gondola with respect to said envelope structure from a point generally under said envelope structure when the longitudinal axis of said envelope structure is generally horizontal to a point generally at the nose of the envelope structure when the longitudinal axis of said envelope structure is generally vertical, while said gondola maintains a generally horizontal orientation;

means for positioning said gondola at desired locations on said mounting means; and propulsion means mounted to said envelope structure for providing thrust in a desired direction with respect to said envelope structure, such that when said envelope structure is in said generally horizontal configuration, said propulsion means can provide generally horizontally oriented propulsion for generally horizontal in-flight drive, and when said envelope structure is in said generally vertical configuration, said propulsion means can provide generally vertically oriented propulsion to urge said airship to descend.

29. An airship according to claim 28 which further includes anchoring means provided only on said gondola for anchoring said airship at a landing site substantially without requiring support means to be provided on said envelope structure for contacting the ground.

30. An airship according to claim 29 wherein said anchoring means comprises:

attachment means coupled to said gondola generally at its front end, said attachment means adapted for rotatable attachment to a stanchion affixed to the ground; and roller means mounted to said gondola generally near its back end for permitting said back end of said gondola to roll along the ground, such that when said airship is anchored by said stanchion, said gondola is substantially freely rotatable about said stanchion to accommodate prevailing winds at the anchoring site substantially without damaging the airship.

31. An airship according to claim 29 wherein said anchoring means comprises a mounting structure provided on the bottom of said gondola generally at the center of gravity of said gondola, said mounting structure adapted for coupling to a suitable anchoring structure affixed to the ground to enable said gondola to rotate relative to the ground such that said gondola is capable of substantially freely rotatable anchoring to the ground to accommodate prevailing wind conditions at the anchoring site.

32. An airship according to claim 31 wherein said mounting structure includes electromagnet means operable from said gondola and wherein said anchoring structure is ferromagnetic, such that said mounting structure is capable of electromagnetic coupling to said anchoring structure.

33. An airship according to claim 28 wherein said propulsion means are capable of reversible thrust such that when said envelope structure is in said generally vertical configuration, said propulsion means can provide generally vertically oriented thrust to urge said airship to ascend.

34. An airship according to claim 33 wherein said propulsion means comprise driven propeller devices which include propellers with reversible pitch blades.

35. An airship according to claim 28 wherein said propulsion means includes at least two propulsion devices mounted on generally opposite sides of said envelope structure to provide vertical thrust for descent such that the attitude of the airship can be controlled by said propulsion devices for a substantially stable descent.

36. An airship according to claim 35 which includes three of said propulsion devices mounted to said envelope structure in a generally symmetrical manner.

37. An airship according to claim 36 wherein said propulsion devices are capable of reversible thrust such that when said envelope structure is in said generally vertical configuration, said devices can provide generally vertically oriented thrust for driving said airship aloft.

38. An airship according to claim 37 wherein said propulsion devices are driven propeller devices which include propellers with reversible pitch blades.

39. An airship according to claim 35 wherein said propulsion devices are capable of reversible thrust such that when said envelope structure is in said generally vertical configuration, said devices can provide generally vertically oriented thrust for driving said airship aloft.

40. An airship according to claim 39 wherein said propulsion devices are driven propeller devices which include propellers with reversible pitch blades.

41. An airship according to claim 28 wherein said mounting means for mounting said gondola to said envelope structure includes:

structural/track means generally rigidly attached to said envelope structure, extending from a point generally near its nose section to a point generally near its midsection, said structural/track member being adapted to accommodate generally slidable mounting of said gondola;

track-mounting means attached to said gondola for slidably mounting said gondola to said structural/track means; and, wherein said positioning means enable said gondola to be positioned at substantially any desired point along said structural/track means.

42. A method for effecting vertical movement of a lighter-than-air airship which is convertible between generally horizontal and generally vertical configurations, comprising the steps of:

substantially ceasing any generally horizontally directed propulsion;

generally slidably moving the airship gondola from a point generally under the airship envelope structure to a point generally at the nose of the airship envelope structure for rotating the longitudinal axis of the airship envelope structure to a generally vertical orientation while maintaining the gondola in a generally horizontal orientation; and propelling said airship downwardly by propulsion means mounted to the airship envelope structure until the desired altitude is reached.

43. A method for effecting horizontal movement of a lighter-than-air airship which is convertible between generally horizontal and generally vertical configurations, which includes the steps of:

substantially ceasing any generally vertically directed propulsion;

generally slidably moving the airship gondola from a point generally at the nose of the airship envelope structure to a point generally under the airship envelope structure for rotating the longitudinal axis of the envelope to a generally horizontal orientation while maintaining the gondola in a generally horizontal orientation; and propelling said airship in a generally horizontal direction by propulsion means mounted to the airship envelope structure.

44. A method for anchoring an airship containing a lighter-than-air gas, which is convertible between generally horizontal and generally vertical configurations, comprising the steps of:
   ceasing generally all generally horizontally directed propulsion;
   generally slidably moving the airship gondola to a point generally at the nose of the airship envelope structure for orienting the longitudinal axis of the airship envelope structure to a generally vertical orientation while maintaining the gondola in a generally horizontal orientation;
   propelling the airship downwardly;
   positioning magnet means attached to the gondola in position for attraction to a magnetically attractive member secured to the earth; and
   allowing the magnet means and the magnetically attractive member to become coupled by magnetic attraction therebetween.

45. A method according to claim 44 which further includes the step of fastening the gondola to a suitable structure affixed to the earth.

46. A method according to claim 45 wherein the gondola is fastened to the magnetically attractive member.

47. A method according to claim 46 wherein a portion of the magnet means is fastened to the magnetically attractive member.

48. A method according to claim 45 which further includes the step of providing rotational capability for the coupling between the gondola and the structure affixed to the earth, such that the gondola can rotate with respect to the ground when the anchored airship is subjected to winds.

49. A method according to claim 44 wherein said magnet means comprises an electromagnet and which further includes the step of activating said electromagnet prior to allowing coupling between the electromagnet and the magnetically attractive member.

50. A method according to claim 49 which further includes the steps of:
   fastening the gondola to a suitable structure affixed to the earth; and
   de-activating the electromagnet.

51. A method according to claim 50, wherein the gondola is fastened to the magnetically attractive member.

52. A method according to claim 51 wherein a portion of the electromagnet is fastened to the magnetically attractive member.

53. A method according to claim 50 which further includes the step of providing rotational capability for the coupling between the gondola and the structure affixed to the ground such that the gondola can rotate with respect to the ground when the anchored airship is subjected to winds.

* * * * *